UNITED STATES PATENT OFFICE.

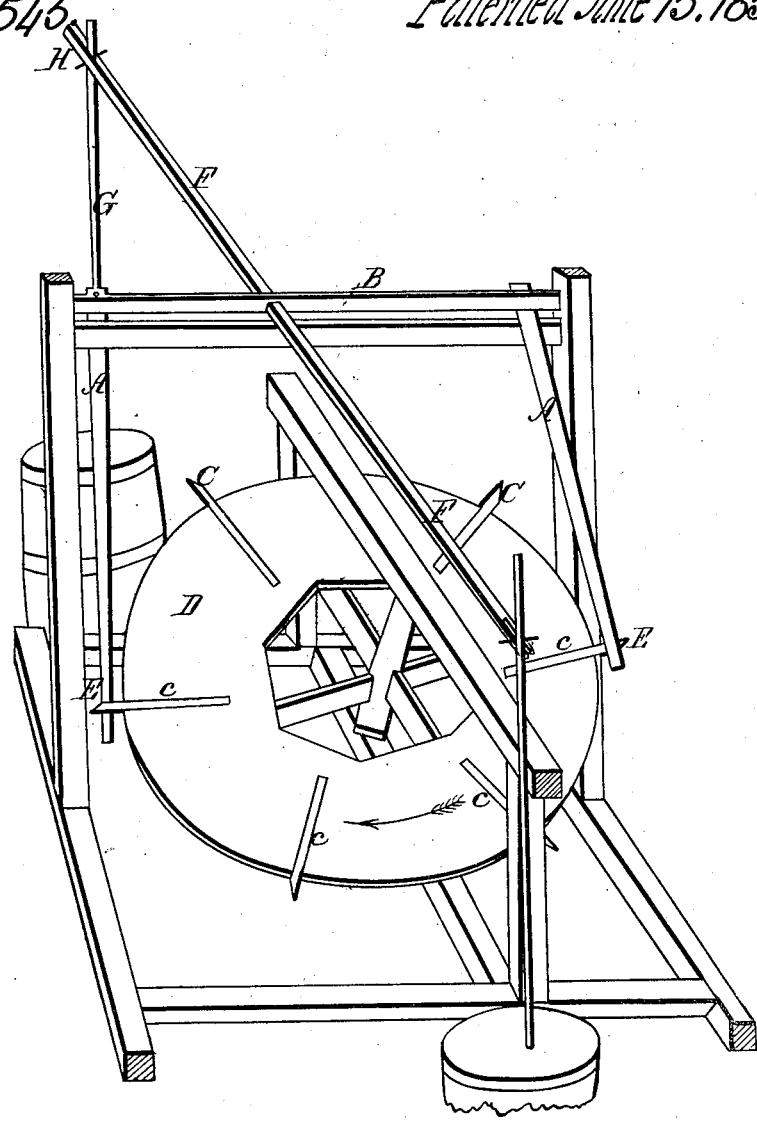

A. G. BRUSH, OF GREAT BEND, PENNSYLVANIA.

OPERATING CHURNS.

Specification of Letters Patent No. 20,545, dated June 15, 1858.

*To all whom it may concern:*

Be it known that I, ADDISON G. BRUSH, of Great Bend, in the county of Susquehanna and State of Pennsylvania, have invented a new and useful Improvement on a Machine for Churning Butter, commonly called a "Dog-Churn;" and I do hereby declare that the following is a full, clear, and exact description of the construction and operation of the same, reference being had to the annexed drawing, making a part of this specification, of which—

Figure 1, is a perspective view.

To enable others to construct and use my invention, I proceed to describe it.

Fixed in a suitable frame, I employ the common tread-wheel used in the ordinary dog-churn, making it however heavier at or near the periphery, to steady and equalize its motion, and place it in the frame as shown in the figure; but instead of cog or pulley gearing, I apply the power to the uses intended, by means of arms or levers connected with a shaft and the tread-wheel, thus—

A, A, are two arms, one end of each of which is made fast in the shaft B, which turns freely on gudgeons, and serves as a fulcrum. These arms extend downward from the shaft B, far enough to be acted upon by the short arms c, c, c, fixed to the upper surface of the tread-wheel and projecting from the periphery of the same, as shown. The dog, or other beast, being placed upon the tread-wheel at D, revolves it in direction of the arrow. The end of the arm A, at E, is moved by the projecting arm c, of the tread-wheel, until it slips or escapes over the projecting arm c, when the lower end of the other arm A, is immediately caught by another projecting arm c, of the tread-wheel on the opposite side of it, and moved in an opposite direction to the first arm A, and when that arm also escapes, the arm first moved is again caught and moved as before. The arms A, A, thus alternately acted upon, are kept in constant vibration, moving the shaft B, to which they are fixed, with them.

Transversely through the shaft B, I insert the arms F, F, horizontally, and which being made fast to the shaft B, move with it. To the arm F at H, is attached the rod G, and to the lower end of that rod is fixed the dasher of the common churn.

The dasher is moved in the manner required by the combination of arms or levers substantially as specified, the length of the stroke being regulated by the length of the arm F, which may operate two churns, if required. An increase of power and rapidity of stroke may be attained by raising the side of the frame, to which the whole apparatus is attached, which gives the pathway of the tread-wheel more or less inclination.

What I claim and desire to secure by Letters Patent, is—

The arrangement of the revolving platform D, having short arms or tappets c, c, c, attached and operating the churn dasher in connection with arms A, A, and F, and shaft B, the whole constructed as specified.

ADDISON G. BRUSH.

Witnesses:
WILLIAM SMITH,
JONAS BRUSH.